United States Patent
ter Horst

(10) Patent No.: US 12,201,928 B2
(45) Date of Patent: Jan. 21, 2025

(54) REINFORCED AIR FILTER

(71) Applicant: Filtration Advice, Inc., Boca Raton, FL (US)

(72) Inventor: Dirk ter Horst, Boca Raton, FL (US)

(73) Assignee: Filtration Advice, Inc., Boca Raton, FL (US)

( * ) Notice: Subject to any disclaimer, the term of this patent is extended or adjusted under 35 U.S.C. 154(b) by 0 days.

(21) Appl. No.: 18/127,385

(22) Filed: Mar. 28, 2023

(65) Prior Publication Data

US 2024/0216846 A1 Jul. 4, 2024

Related U.S. Application Data

(63) Continuation of application No. 18/091,109, filed on Dec. 29, 2022, now Pat. No. 11,638,893.

(51) Int. Cl.
*B01D 46/00* (2022.01)
*B01D 46/52* (2006.01)

(52) U.S. Cl.
CPC ..... *B01D 46/0001* (2013.01); *B01D 46/0005* (2013.01); *B01D 46/521* (2013.01); *B01D 46/523* (2013.01); B01D 2265/04 (2013.01)

(58) Field of Classification Search
CPC ........... B01D 46/521; B01D 46/523; B01D 46/0001; B01D 46/0005; B01D 2265/04
See application file for complete search history.

(56) References Cited

U.S. PATENT DOCUMENTS

| | | | |
|---|---|---|---|
| 3,716,970 A | 2/1973 | Stupf et al. | |
| 5,053,131 A | 10/1991 | Lippold | |
| 5,071,555 A | 12/1991 | Enbom | |
| 5,888,262 A | 3/1999 | Kaehler | |
| 9,314,717 B2 | 4/2016 | ter Horst et al. | |
| 10,143,951 B2 | 12/2018 | ter Horst et al. | |
| 2003/0075500 A1 | 4/2003 | Kleingünther et al. | |
| 2004/0112023 A1 | 6/2004 | Choi | |
| 2007/0182062 A1 | 8/2007 | Wood | |
| 2008/0067121 A1 | 3/2008 | ter Horst et al. | |
| 2012/0261331 A1 | 10/2012 | ter Horst et al. | |
| 2015/0113929 A1* | 4/2015 | Jackson | B01D 46/2411 55/482 |
| 2016/0067647 A1 | 3/2016 | Tate et al. | |
| 2016/0243481 A1 | 8/2016 | ter Horst et al. | |

FOREIGN PATENT DOCUMENTS

| | | |
|---|---|---|
| DE | 2138412 A1 | 3/1973 |
| DE | 2718217 A1 | 11/1978 |
| DE | 8617256 U1 | 12/1986 |
| WO | 2017139268 A1 | 8/2017 |

OTHER PUBLICATIONS

International Search Report and Written Opinion for corresponding application PCT/US2023/029289 dated Sep. 20, 2023.

* cited by examiner

*Primary Examiner* — Robert Clemente
(74) *Attorney, Agent, or Firm* — Bachman & LaPointe, P.C.

(57) ABSTRACT

An air filter includes an air filter pack includes air filtration media folded along fold lines to define adjacent walls separated by connecting peaks at the fold lines; and a beam defined on both sides of the air filtration media and extending transverse to the fold lines. A frame can enclose the filter pack, and methods for making are also disclosed. The beam can be formed of cured adhesive and reinforces the filter against bending due to upstream air pressure.

10 Claims, 5 Drawing Sheets

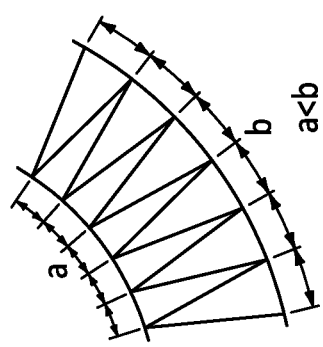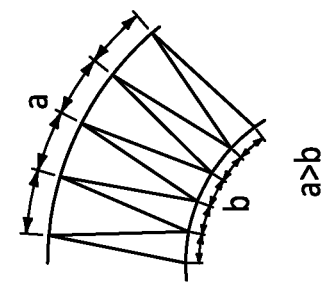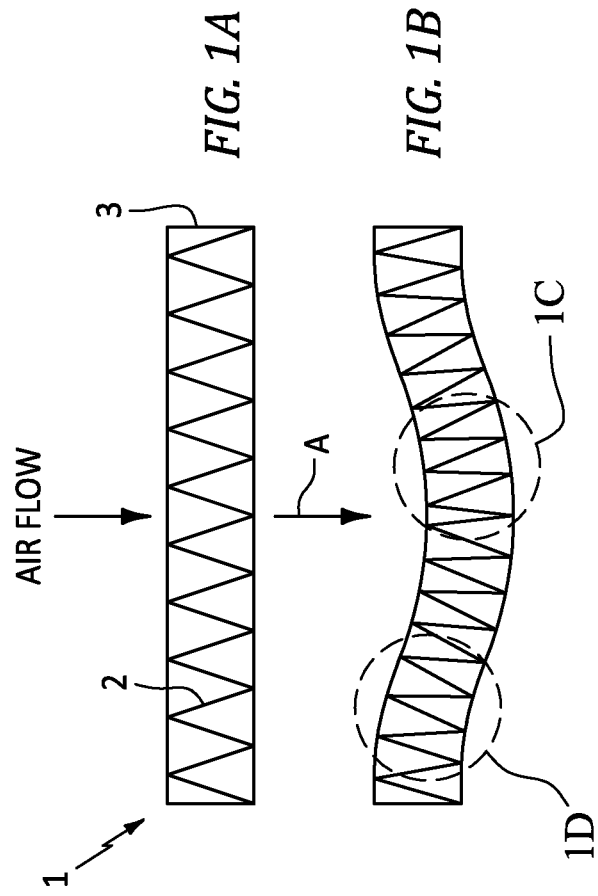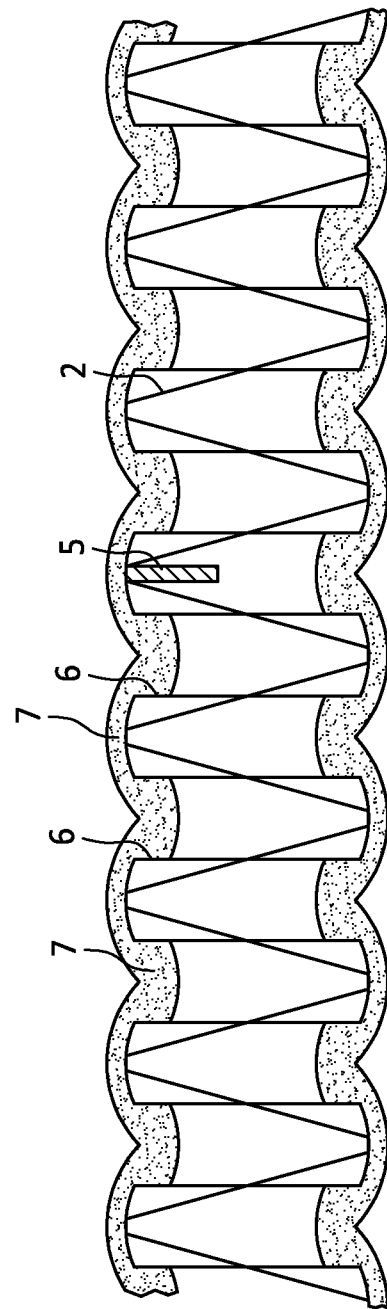

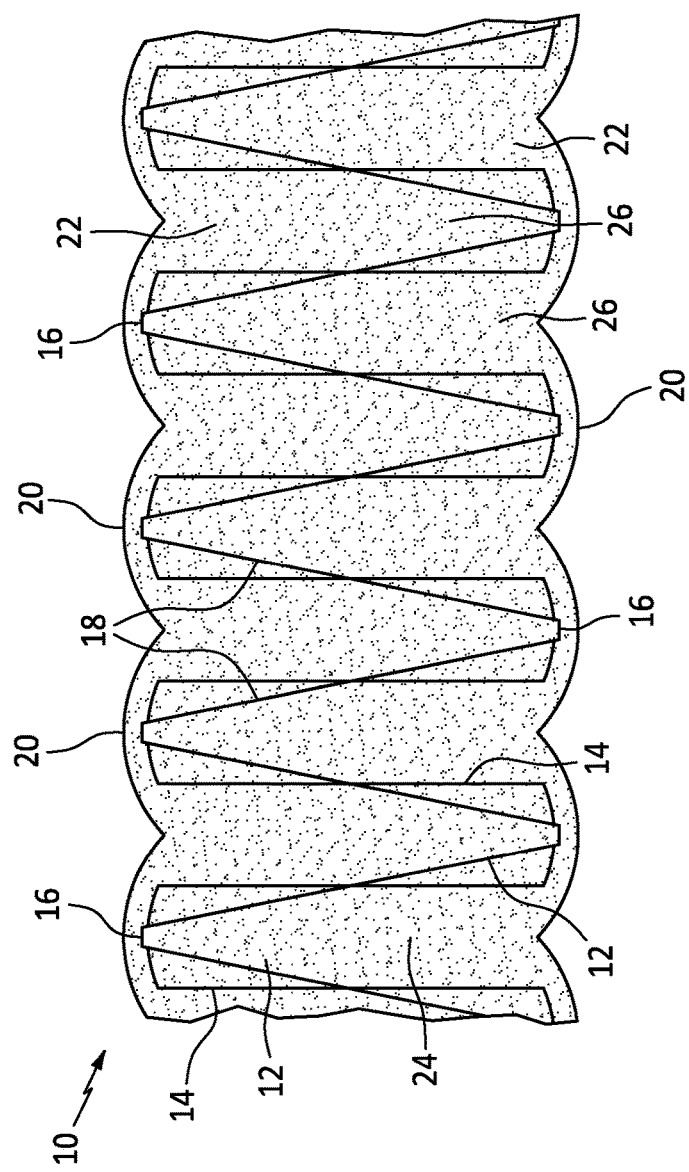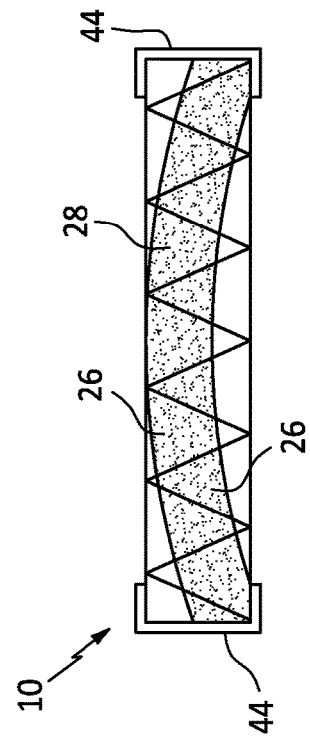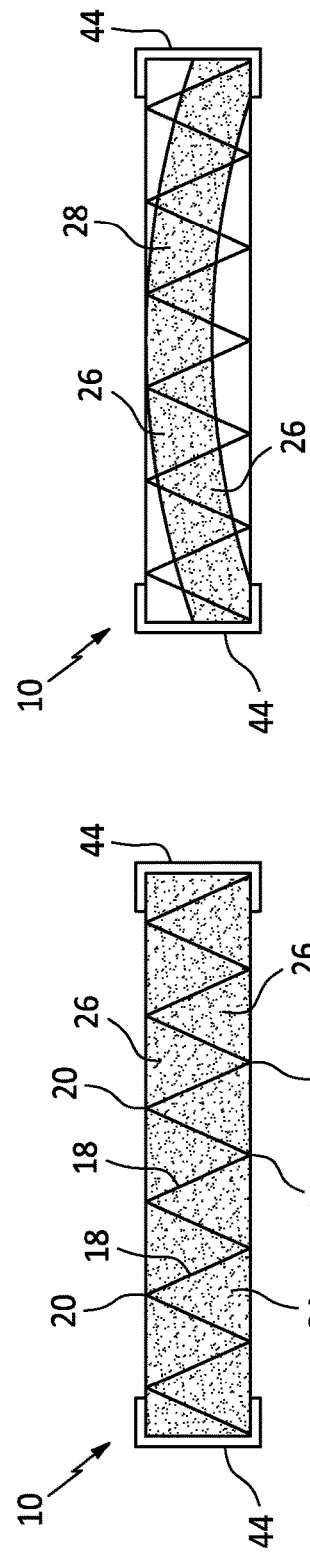

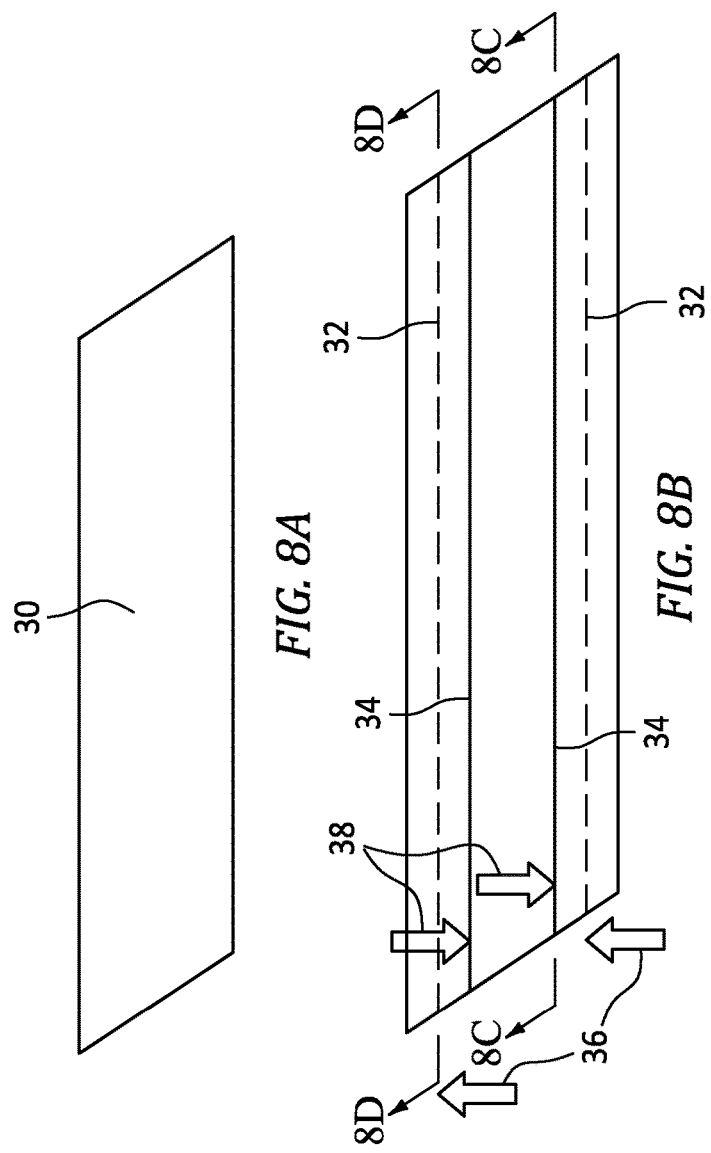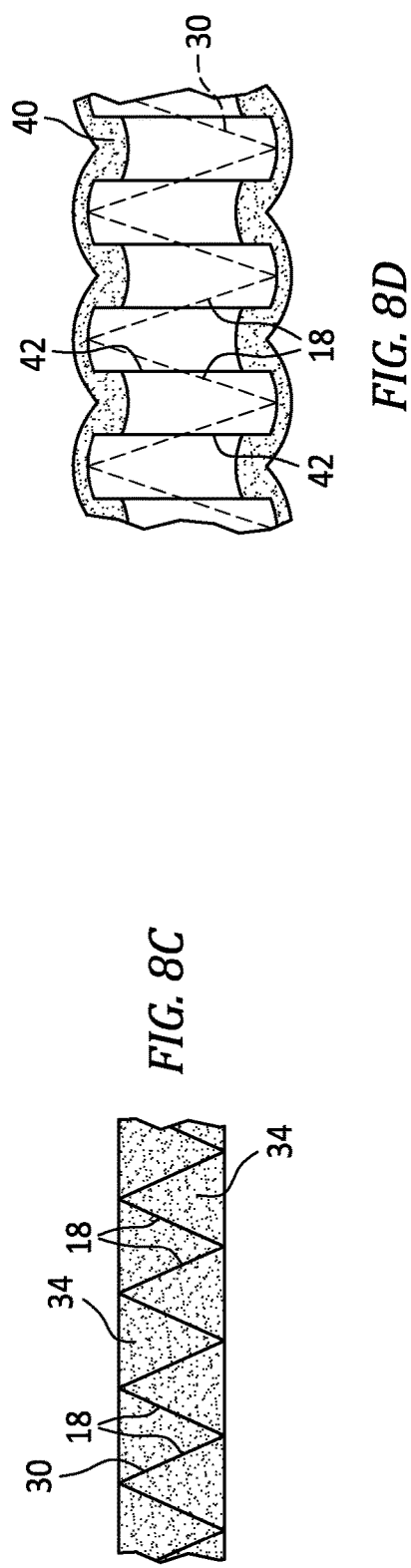

REINFORCED AIR FILTER

CROSS-REFERENCE TO RELATED APPLICATION

This application is a continuation of U.S. patent application Ser. No. 18/091,109, filed Dec. 29, 2022.

BACKGROUND OF THE INVENTION

The invention relates to air filtration and, more particularly, to an air filter which is reinforced against problematic bending due to upstream air pressure during use.

Air filters can include a filter media that is arranged into suitable filtering structure such as a zig-zag pattern, and the resulting structure, or filter pack, can be mounted into a frame to define an air filter that can be useful in numerous air treatment capacities such as HVAC systems and the like. In use, the air filter is placed across a flow of air and the air passes through the folded filter media which filters out undesirable materials.

During use, there can be substantial pressure upstream of the filter, and this pressure can cause the filter pack to bend away from the air flow, creating undesirable flow conditions wherein the lateral spacing of folds or pleats in the filter pack can be less at the upstream side than the downstream side, and also adjacent possible areas of bending wherein the spacing of folds or pleats in the filter pack can be greater at the upstream side than the downstream side. These conditions are illustrated in FIGS. 1a-1d discussed below, and can lead to further deformation of the air filter and, eventually, complete failure of the air filter.

One known solution to this problem is to incorporate a stiffening bar along one of the pleats, and to anchor the stiffening bar in the frame. By centrally locating such a stiffening bar, the bending of the air filter can be somewhat reduced. Nevertheless, the problem of such bending can still occur between the stiffening bar and the adjacent anchoring point, for example the frame wall.

The need remains for an air filter that resists bending during use and thereby maintains the intended flow and filtration efficiency.

SUMMARY OF THE INVENTION

The present disclosure relates to an air filter and a method for making an air filter wherein adhesive is applied to the filter media during manufacture and then during folding of the air filter media into a filter pack, the adhesive joins together to define a reinforcement beam of adhesive that can be substantially transverse to the pleats or folds in the folded filter media. This beam reinforces the folded filter media or filter pack such that when it is incorporated into a frame to make an air filter, the filter resists deformation due to upstream air pressure and better maintains the intended form.

In one configuration, an air filter comprises an air filter pack comprising air filtration media folded along fold lines to define adjacent walls separated by connecting peaks at the fold lines; and a beam defined on both sides of the air filtration media and extending transverse to the fold lines.

In another non-limiting configuration, the beam comprises a cured adhesive material.

In still another non-limiting configuration, the beam comprises a solid beam that extends along an entire depth of the filter pack, from upstream oriented peaks to downstream oriented peaks.

In a further non-limiting configuration, the beam is defined by beam sections arranged along a beam axis between adjacent walls of the air filter pack.

In a still further non-limiting configuration, the beam sections define an arched beam.

In another non-limiting configuration, the arched beam is convex facing toward an upstream side of the air filter.

In still another non-limiting configuration, the air filter further comprises strands of cured adhesive extending along the peaks of the filter pack.

In a further non-limiting configuration, the strands of cured adhesive are positioned on either side of the beam.

In a still further non-limiting configuration, a plurality of beams are positioned extending transverse to peaks of the filter pack.

In another non-limiting configuration, the air filter further comprises a filter frame having side walls, the filter pack being mounted in the filter frame.

In still another non-limiting configuration, the beam extends contiguously between each pair of adjacent walls of the filter pack, whereby the filter pack is reinforced against bending due to air flow.

In another non-limiting embodiment, a method for making an air filter comprises applying lines of adhesive along a flat sheet of filter media, wherein a first plurality of the adhesive lines are relatively narrow adhesive lines and a second at least one of the adhesive lines is a relatively thicker adhesive line; folding the flat sheet of filter media into a filter pack comprising a plurality of walls defined by adjacent folds along fold lines, the folds defining peaks, wherein the relatively narrow adhesive lines extend along at least the peaks on one side of the filter pack, and wherein the relatively thicker line defines a beam comprising adhesive material on both sides of the filter media and extending between adjacent walls; and curing the adhesive to define the beam of cured adhesive.

In a further non-limiting configuration, the method further comprises positioning the filter pack in a frame.

In a still further non-limiting configuration, the relatively narrow adhesive lines are applied only along surfaces of the filter media that will define an outer surface of the peaks.

In another non-limiting configuration, the relatively thicker adhesive line is applied along an entire length of the filter media.

In still another non-limiting configuration, a first relatively thicker adhesive line is applied on one side of the filter media, and a second relatively thicker adhesive line is applied on the other side of the filter media, whereby the folding step positions the relatively thicker lines along both sides of the filter media to define the beam.

In a further non-limiting configuration, the first relatively thicker adhesive line and the second relatively thicker adhesive line are applied along the same path on opposite sides of the filter media.

In a still further non-limiting configuration, the first relatively thicker adhesive line is applied in segments along the filter media such that the folding step defines beam sections arranged along a beam axis between adjacent walls of the air filter pack.

In another non-limiting configuration, the beam sections define an arched beam.

In still another non-limiting configuration, the arched beam is convex facing an upstream side of the filter pack.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

A detailed description of non-limiting embodiments of the present disclosure follows, with reference to the attached drawings, wherein:

FIG. 1A-1D illustrate a bending problem that occurs with known air filters;

FIG. 2 illustrates a known filter pack having a stiffening bar to try to prevent the problems illustrated in FIGS. 1a-1d;

FIG. 5 illustrates a sectional view of an air filter with a reinforcing beam according to the invention;

FIG. 6 further illustrates the air filter of FIG. 4;

FIG. 7 illustrates an alternative embodiment having an arched beam reinforcement;

FIG. 8A-8D illustrate a method for making the air filter of the present invention.

DETAILED DESCRIPTION

The invention relates to a reinforced air filter and to a method for making same. The air filter has a reinforcing beam that can be fabricated from cured adhesive applied during manufacture, and the beam helps the filter to resist bending during use.

FIGS. 1A-1D schematically illustrate an air filter 1 which comprises an air filtration media 2 that is folded into a zig zag pattern to define adjacent walls connected by peaks or pleats, wherein the folded filtration media is mounted in a frame 3, all as schematically illustrated in FIG. 1A. During use, air flow is passed across air filter 1, as represented by arrow A, and this air flow has a tendency to bend the air filter, especially along the fold lines of the filter. FIG. 1B illustrates one form of such bending, wherein the central portion of the air filter bends away from the air flow. FIG. 1C illustrates an enlarged portion of FIG. 1B, corresponding to a center portion of the bending filter, and shows the resulting effect upon spacing of the upstream pleats and the downstream pleats (as defined by air flow A). As shown, in this portion of the air filter, spacing between upstream pleats (a) is less than spacing between downstream pleats (b) such that a<b. This is not desirable and can lead to an increase in pressure drop and even greater bending of the filter.

Further, FIG. 1D illustrates bending of the air filter in the portions adjacent to the portion illustrated in FIG. 1C, where the filter actually bends in the opposite direction, such that in these areas, spacing between upstream pleats (a) is greater than spacing between downstream pleats (b) such that a>b, and this also is undesirable and leads to instability of the air filter during continued use. Bending such as is illustrated in FIGS. 1A-1D can lead eventually to failure of the air filter.

Figure 3:
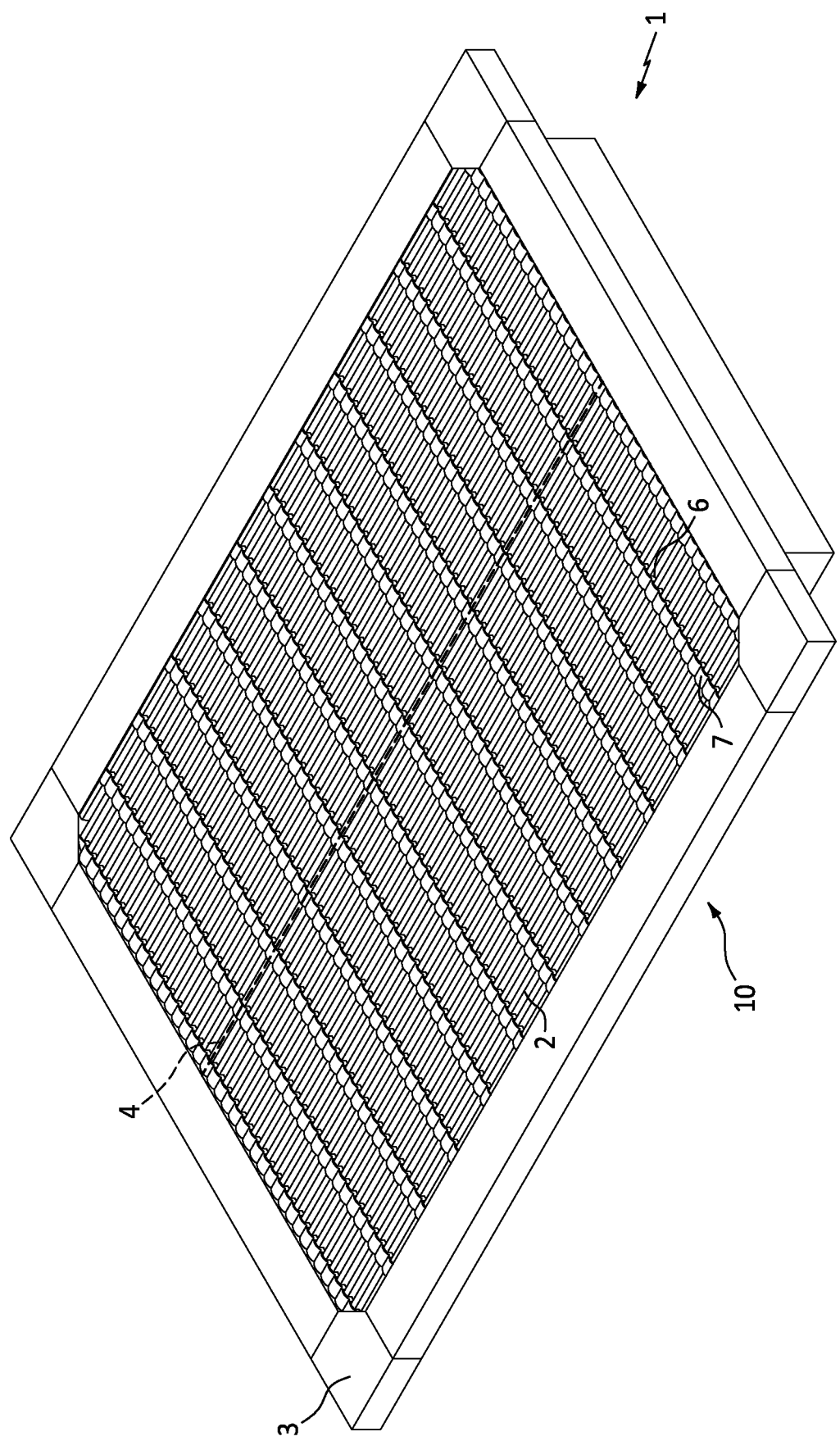
FIG. 3 is a perspective illustration of an air filter showing location of a stiffening bar according to the known solution of FIG. 2.

In one known attempt to combat this bending, a bar can be mounted inside one of the pleats of the air filter. FIGS. 2 and 3 illustrate an air filter 1 in a frame 3 and shows a location 4 (FIG. 3) where this bar 5 (FIG. 2) can be positioned, and anchored at opposite ends in frame 3. This helps to prevent bending at the location of the bar. However, the spaces between the bar and the side walls parallel to the bar are still subject to the same bending problem as discussed above with respect to FIGS. 1A-1D.

FIGS. 2 and 3 also illustrate other features of an air filter that may be included also in the inventive embodiments disclosed below. For example, FIGS. 2 and 3 show filter media 2 with embossings 6 that can be formed into filter media 2, and these embossings 6 can be useful in helping to provide some stability to the air filter. Further, FIGS. 2 and 3 show a bead of adhesive 7 that can be positioned along the embossings and peaks of the filter pack to help hold the intended form of the filter pack.

Figure 4:
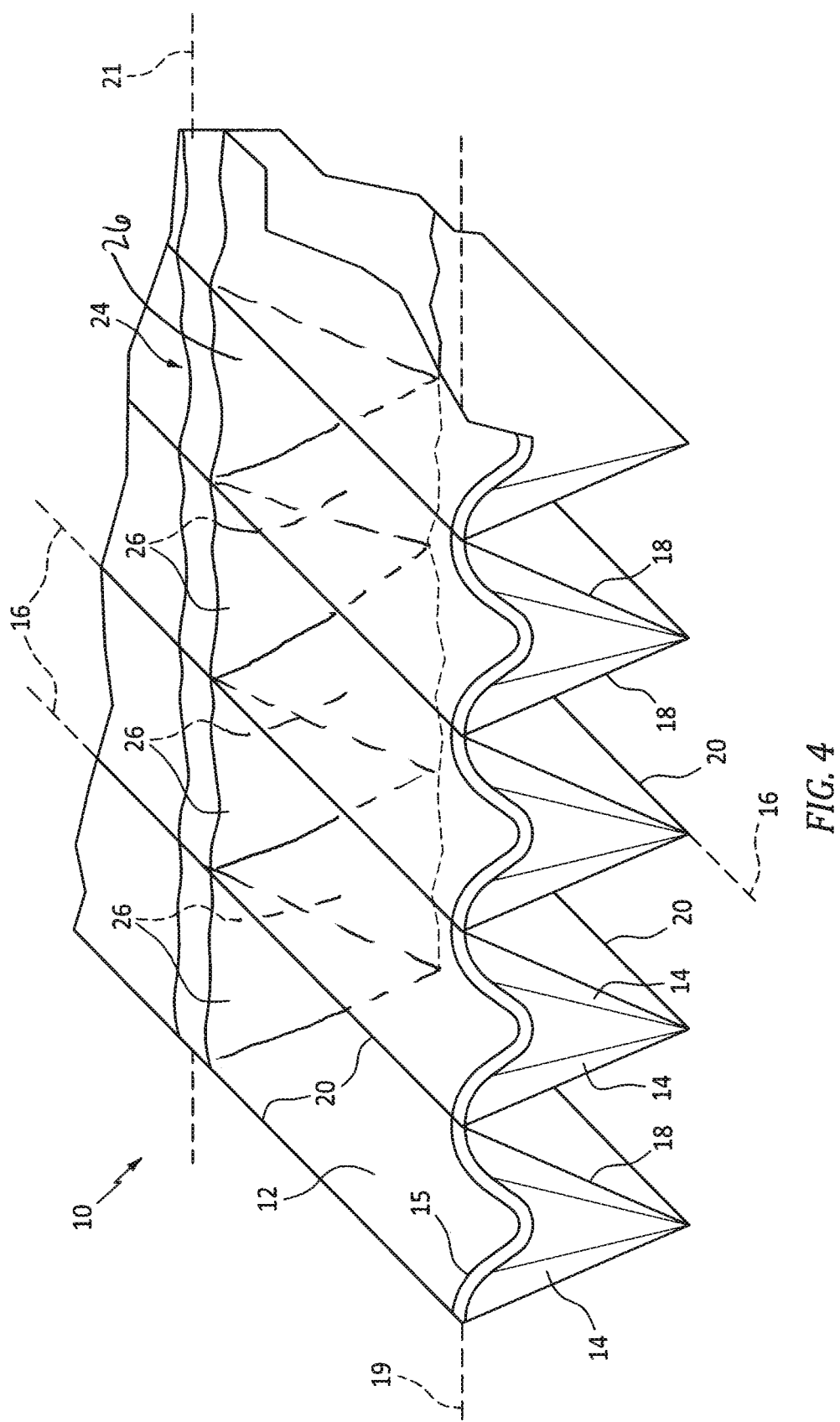
FIG. 4 illustrates a reinforcement beam according to the present invention.

Referring now to FIGS. 4 and 5, a reinforced filter 10 according to the present invention is illustrated. FIG. 4 is a perspective view of a filter 10 according to the invention wherein filter media 12 is formed into walls 18 connected by peaks 20. These walls 18 define a filter pack that can be mounted in a frame such as frame 3 (FIG. 2) to form a filter 10. FIG. 4 shows, along one cross-fold axis 19, a series of embossings 14 with adhesive 15 for joining and holding walls 18 together. Further, a reinforcement beam 24 is formed along another cross-fold axis 21 as shown, and can be defined by adhesive material applied on both sides of filter media 12 or walls 18 such that beam sections 26 are defined between adjacent walls 18 to support and reinforce walls 18 against opening or closing movement to help prevent the a>b or a<b problems discussed above with respect to FIGS. 1A-1D. Given the perspective view of FIG. 4, only sections 26 of beam 24 that are between upwardly opening walls 18 can be directly seen. Sections 26 between downwardly opening walls are represented in broken lines. A solid beam with sections 26 between each pair of adjacent walls 18 can serve to greatly strengthen filter 10 against bending along a cross-fold axis 21, and thereby help to prevent deformation of the filter.

In accordance with the present invention, a thicker bead of adhesive is used to create the beam, for example a cured adhesive beam, built into the air filter along one or more cross-fold axes, generally transverse to the fold lines of the filter pack, and therefore also generally transverse to the location of the stiffening bar 5 of known attempted solutions. The air filter can be manufactured with one or more of such thicker beads of adhesive to define the beam or beams, and these beams are defined by adhesive on both sides of the filter media, and to form a generally solid structure on both sides (upstream and downstream facing sides as defined by air flow A, FIG. 1A) of the folded filter media to help resist the bending described above with respect to FIGS. 1A-1D. As will be further discussed below, the adhesive beam of the present invention can be formed by applying a thicker line or bead of adhesive during treatment of the filter media in desired locations before forming into the zig zag pattern of the filter, and when the filter media is folded, the thicker line or bead of adhesive defines the stiffening or reinforcement beam 24 as disclosed herein.

FIG. 5 shows a partially schematic section through filter 10 of FIG. 4, taken through beam 24. As shown, filter media 12 with embossings 14 has been folded along fold lines 16 to define adjacent walls 18 connected by peaks 20 facing in alternating opposite directions. FIG. 5 shows adhesive 22 encompassing filter media 12 on both sides. When the adhesive is cured, a solid beam is defined that will greatly resist bending such as is shown in FIGS. 1A-1D. Beam 24 is defined by beam sections 26 defined along a beam axis or cross-fold axis 21 (FIG. 4), with a section 26 between each pair of walls 18 along that axis, and beam sections 26 support each wall relative to neighboring walls, and thereby resists bending.

In applying adhesive to form the desired beam, adhesive can be applied substantially constantly or continuously, and the end result will be a filter 10 with beam 24 as shown in FIG. 6, which is a schematic section through beam 24. Beam 24 in the configuration of FIG. 6 is a substantially solid beam filling space between upstream and downstream peaks 20 as shown, defining sections 26 between walls 18 and extending in the cross-fold direction or axis between opposite walls 44 of the frame of the filter. Alternatively, and as shown in FIG. 7, adhesive can be applied in discrete segments or sections, but still on both sides of the filter media, so as to define beams that need not encompass the entire folded filter pack. In the example of FIG. 7, the example shown has beam sections 26 that together define an arch-shaped beam 28 which in this case is arched such that the surface facing upstream, or into the air flow, is convex. This also helps to resist the bending of the filter. In this configuration, the arch shaped beam does not completely fill the entire space between oppositely directed peaks 20, but does nevertheless contain sections 26 that extend continuously between walls 44 of the frame.

Referring back to FIG. 4, it should be appreciated that filter 10 according to the invention could be made with just one reinforcement beam 24, that could for example be centrally located. It is also possible to add a plurality of reinforcement beams, all substantially parallel to each other. Further, each of these beams does not have to have the same thickness or amount of adhesive. For example, for a reinforcement that is closer to one or the other of the parallel walls of the frame, a smaller beam can be added since the bending force in this location will be smaller. In addition, the plurality of beams does not need to be parallel to each other, and could be arranged at slightly different angles relative to one another. Still further, the cross-fold axis along which beams are defined does not need to be perpendicular to the fold axes of the filter, and could be arranged diagonally, for example to extend at an angle from one side of the filter to the other.

Reinforcement beams as disclosed herein can be formed or otherwise positioned along the filter media in numerous ways. One particularly useful manner of application of the reinforcing beam is to apply adhesive during embossing and folding of the filter pack such that the adhesive cures into the desired beam after the filter media is folded or pleated. The adhesive used to make the inventive beam (s) can also be used in lesser amounts, as is known conventionally, to help bond the peaks of adjacent pleats in place. Thus, FIGS. 8A-8D schematically illustrate a method for making the reinforced air filter as disclosed herein.

FIG. 8A shows a substantially flat sheet 30 of filter media. Sheet 30 would typically be moving, for example by rollers, along a manufacturing path wherein the filter media can be embossed, adhesive can be applied, and the media can be folded into the shown zig zag pattern. Thus, FIG. 8B shows applications of strands or beads of adhesive 32, 34, wherein beads 32 are relatively thinner threads of adhesive that are used to join peaks together, or to join adjacent embossings together at the peaks. These beads can be disjointed, with typically only a minimum amount of adhesive applied, for example sufficient to bond adjacent peaks relative to each other during manufacture. On the other hand, beads 34 are to define beam 24 when the media is folded into shape, and therefore beads 34 can be a relatively thicker strand or bead of adhesive, that can advantageously be applied to both sides of the filter media, as indicated schematically by upwardly and downwardly pointed arrows 36, 38. The adhesive on both sides should be applied along the same path as each other, top and bottom sides of the filter media, so that when folded into the filter pack, the adhesive on both sides is aligned to form the reinforcing beam as desired.

From the adhesive application station, the filter media with adhesive applied can be folded to define the desired end structure such as is shown in FIGS. 4 and 5-7. During this folding, adhesive beads 32 contact each other at the embossings, along cross-fold line 19 (FIG. 4), while adhesive beads 34 contact each other to define beams 24 along cross-fold line 21. Further, FIG. 8C shows a cross section taken through the folded filter pack along the lines 8C-8C of FIG. 8B, after the filter media has been folded. FIG. 8C shows filter media 30 folded into walls 18 and being completely encompassed by adhesive from the relatively thicker adhesive bead 34. This defines a beam comprising adhesive on both sides of the filter media, supporting adjacent walls against bending such that the beam so-defined helps to protect the air filter from bending.

Further, FIG. 8D is a section taken through the resulting filter pack along the lines 8D-8D of FIG. 8B, and in this section, the relatively narrower beads of adhesive are applied only in longitudinal segments such that a cured bead 40 is formed between adjacent embossings 42 of walls 18.

It should be noted that in the configurations illustrated and described herein, the adhesive beam or beams is/are positioned between walls of the filter pack, and can advantageously be positioned along an embossing such as the embossings shown at 14. Applying the adhesive for forming the beams along an embossing can be advantageous as this allows for a substantially uniform thickness of application of adhesive to form the beam, which is possible since the embossing provides surfaces that are relatively parallel to each other when the walls in which they are embossed are at an angle. Nevertheless, it is also possible in come circumstances to position the beam in a position that is not along an embossing. This can be desirable in some instances because the reinforcement beam sections are between the walls themselves, and thereby support the walls on both sides directly. In FIG. 4, beam segments 26 are shown along a line wherein there are either no embossings, or the embossing would be located entirely within the beam. On the other hand, FIG. 5 shows the beam formed along embossings 14.

In the disclosed method, adhesive is applied to both sides of the filter media in what are referred to as lines, beads, strands and sections or segments of same, and these all refer to adhesive as it can be applied using known application technology to apply adhesive to a moving underlying substrate, in this case the filter media.

As set forth above, one or more large beads of adhesive can be applied in order to provide the end product with an adhesive beam reinforcement to provide a desired level of additional stiffness against bending. Further, the larger beads can be applied with greater thickness near the center of the product, and less thickness near the substantially parallel side walls of the frame. With one or more reinforcing beams as disclosed herein, the resulting air filter has a much greater resistance to the bending shown and described with respect to FIGS. 1a-1d above.

The filter media of the present invention can suitably be made out of glass fibers, cellulose fibers, synthetic (e.g., polypropylene, polyester, etc.) or combinations thereof. Further, the adhesive can advantageously be ethylene-vinyl-acetate (EVA) as a copolymer adhesive, or polyester hot-melts or polyurethane. Other suitable examples include amorphous poly-alpha olefins (APAO), polyamide (PA), reactive polyurethane (PUR) and other types of EVA and the like.

The foregoing description is exemplary of the subject matter of the invention disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the invention.

I claim:

1. An air filter, comprising:
an air filter pack comprising air filtration media folded along fold lines to define adjacent walls separated by connecting peaks at the fold lines;
a beam comprising a solid structure of cured adhesive defined on both sides of the air filtration media and extending transverse to the fold lines, wherein the beam comprises a solid beam that extends along an entire depth of the filter pack, from upstream oriented peaks to downstream oriented peaks, wherein the beam comprises beam segments positioned between adjacent walls and filling a space between the adjacent walls extending to adjacent peaks; and further comprising strands of cured adhesive extending along the peaks of the filter pack, wherein the strands of cured adhesive have a smaller bead thickness than the cured adhesive defining the beam.

2. The air filter of claim 1, wherein the beam is defined by beam sections arranged along a beam axis between adjacent walls of the air filter pack.

3. The air filter of claim 2, wherein the beam sections define an arched beam.

4. The air filter of claim 3, wherein the arched beam is convex facing toward an upstream side of the air filter.

5. The air filter of claim 1, wherein the strands of cured adhesive are positioned on either side of the beam.

6. The air filter of claim 1, wherein a plurality of beams are positioned extending transverse to peaks of the filter pack.

7. The air filter of claim 1, further comprising a filter frame having side walls, the filter pack being mounted in the filter frame.

8. The air filter of claim 7, wherein the filter frame comprises a flat, square or rectangular filter frame.

9. The air filter of claim 1, wherein the beam extends contiguously between each pair of adjacent walls of the filter pack, whereby the filter pack is reinforced against bending due to air flow.

10. The air filter of claim 1, wherein the cured adhesive of the beam comprises the same adhesive on both sides of the air filtration media.

* * * * *